May 5, 1942.　　　H. OSTERBERG ET AL　　　2,281,988
VENTILATING DEVICE FOR PROJECTION APPARATUS
Filed May 21, 1940　　　2 Sheets-Sheet 1

INVENTOR
HAROLD OSTERBERG
DAVID I. CRITOPH
BY
Raymond A. Paquin
ATTORNEY

May 5, 1942.  H. OSTERBERG ET AL  2,281,988
VENTILATING DEVICE FOR PROJECTION APPARATUS
Filed May 21, 1940  2 Sheets-Sheet 2
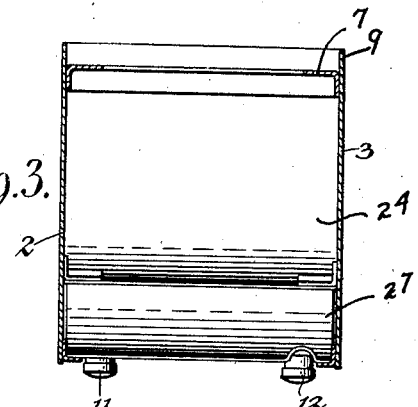
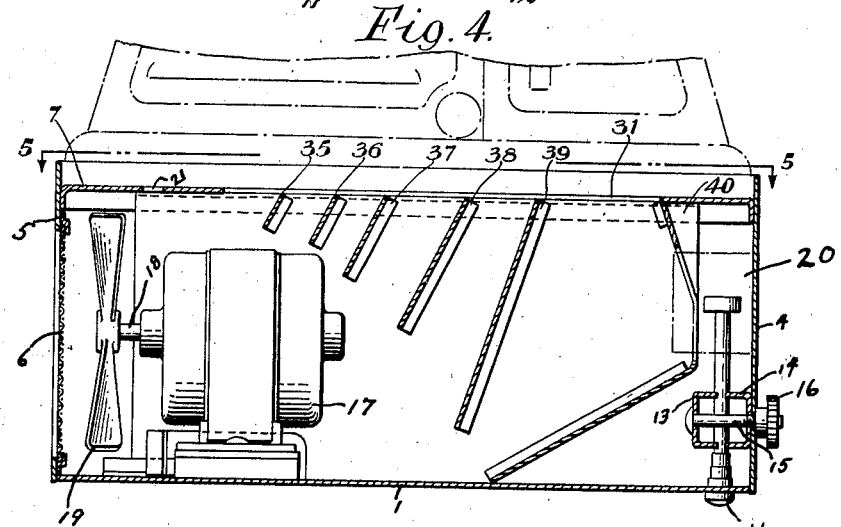
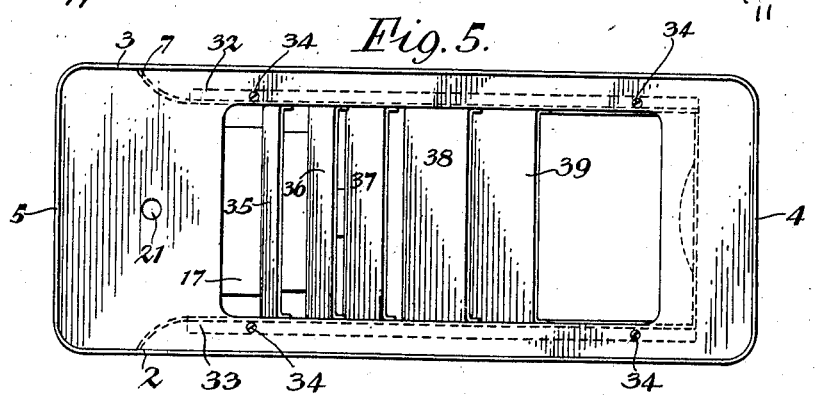
INVENTOR
HAROLD OSTERBERG
DAVID I. CRITOPH
BY
Raymond A. Paquin
ATTORNEY Patented May 5, 1942

2,281,988

UNITED STATES PATENT OFFICE 2,281,988

VENTILATING DEVICE FOR PROJECTION APPARATUS

Harold Osterberg and David I. Critoph, Buffalo, N. Y., assignors to Spencer Lens Company, Buffalo, N. Y., a corporation of New York Application May 21, 1940, Serial No. 336,437

4 Claims. (Cl. 88—24)

This invention relates to ventilating apparatus and has particular reference to a ventilating device adapted to be used in connection with projectors which do not have any self-contained ventilating apparatus.

An object of the invention is to provide a new and improved ventilating apparatus which may be easily and quickly associated with a projector which does not have a self-contained ventilation device.

Another object of the invention is to provide a new and improved ventilation device for projectors, whereby the stream of air for cooling said projectors may be directed to the hottest points of the projectors to provide greater ventilation for said points.

Another object of the invention is to provide new and improved means for ventilating a projector whereby the air stream may be directed to desired points within the projector.

Another object of the invention is to provide new and improved means for ventilating a projector and to provide said ventilating means with means for adjusting said projector to desired positions.

Another object of the invention is to provide a new and improved ventilating apparatus for projectors which will provide the maximum cooling at the points of maximum heat in the projectors to provide a greater amount of ventilation for said points.

Referring to the drawings:

Fig. 3 is a sectional view taken on line 3—3 of Fig. 1, looking in the direction of the arrows;

Fig. 4 is a view similar to Fig. 1, but showing a modified form of the invention; and Fig. 5 is a top plan view of the ventilating apparatus shown in Fig. 4.

Figure 1:
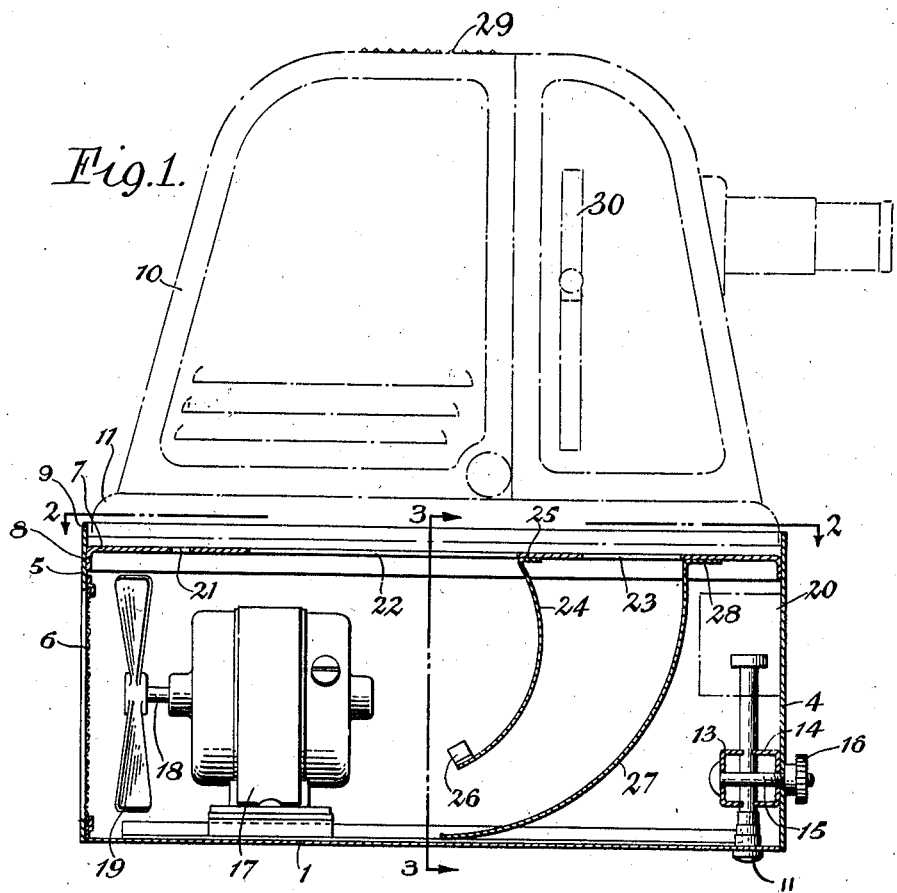
Fig. 1 is a side view in section of a ventilating device embodying the invention and showing it in association with a projector.
Figure 2:
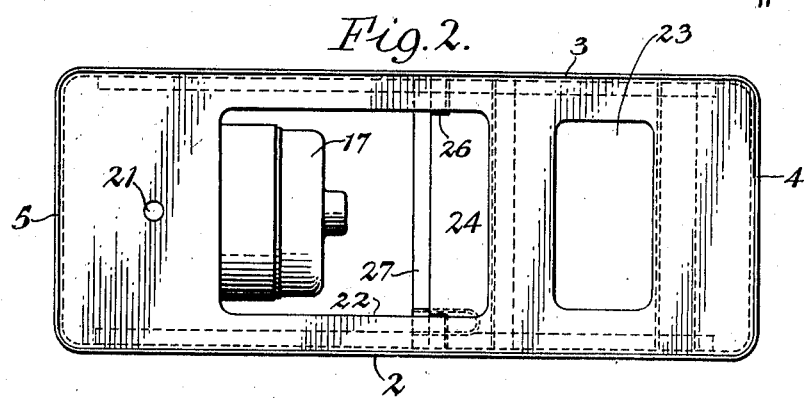
Fig. 2 is a top plan view of the ventilating apparatus shown in Fig. 1.

There are a number of projectors on the market which for ordinary use and with low voltage electric lamps are sufficiently ventilated through openings in the casing of the projector. When electric lamps of higher wattage are used, such as for projection in color or for additional illumination, then the openings in the casing do not provide sufficient ventilation for the projectors. In such cases, separate ventilating apparatuses have been used. Such apparatuses comprised a container on which the projector was adapted to be placed, and in which container there was a blower adapted to draw in air which would be exhausted through the projector and thereby serve to provide some increase of ventilation for the projector. However, it will be apparent that due to the fact that the air was forced upward through the projector, it did not provide maximum ventilation to the points of maximum heat requiring cooling, such as the electric lamp and film or slide.

It is one of the prime objects of this invention to provide a ventilating apparatus or device for projectors of the type set forth wherein the air for cooling the projector is directed to desired points in the projector, such as the lamp and film as stated above.

Referring more particularly to the drawings wherein similar reference characters denote corresponding parts throughout the several views, the ventilating apparatus embodying the invention comprises a casing preferably of sheet metal or the like having the bottom 1, the side walls 2 and 3, the end wall 4, and the front wall 5 having an opening in which is placed a screen or the like 6. The casing has the top 7 having the flange 8 adapted to be secured to the inner surface of the sides and ends of the casing by soldering or welding. This top 7 is preferably secured to the side walls 2 and 3 and end walls 4 and 5 at a point slightly below the upper edge of said side walls so as to form an upstanding flange 9 which is adapted to retain the projector 10 in position on the casing and to prevent loss of ventilation, as will be hereinafter described.

The projector 10 has the base 11 adapted to fit within said flange 9. The projector also embodies an electric lamp or similar source of light, three condensing lenses and a heat absorbing screen and slide holder or film gate, depending on whether the projector is to be used for film slide or lantern slide projection. It will be apparent that while the projector may embody the elements set forth above, the projector may be any conventional type of projector.

At the front end of the casing are the adjustable legs 11 and 12 which are adapted to be adjusted to allow the projector to be raised or lowered, depending on the angle at which it is desired to be used, and the legs are then located in said adjusted position by the clamping members 13 and 14 which are tightened or loosened by means of the screw 15 and knurled nut 16.

At the end of the casing adjacent the opening is positioned the motor 17 on the shaft of which 18 is secured the fan 19. Current for the motor is adapted to be supplied through wires from the rheostat 20 which serves to adjust the speed of the motor and thereby adjust the amount of ventilation.

In the top 7 of the casing is a hole 21 which allows oiling of the motor 17. This top 7 of the casing also contains the ventilation openings 22 and 23. It will be noted that while two such openings 22 and 23 have been shown, a single opening could be employed or a number of openings of any desired number could be employed.

The opening 22 is so located in the member 7 that it is substantially directly below the lamp, the heat absorbing screen and the last condensing lens.

The opening 23 is so located in the member 7 that it is substantially directly below the film gate or slide holder.

Secured to the lower side of the member 7 adjacent the edge of the opening 22 is a deflector 24. This deflector 24 has a flange 25 secured by soldering or the like to the underside of the member 7 adjacent the side of the opening 22 opposite the motor 17 and fan 19. This deflector 24 is curved and secured at its lower end to lugs 26, one on the wall 3 and another on the side wall 4.

The deflector 27 is secured to the underside of the member 7 adjacent the opening 23 on the side of said opening 23 opposite said motor 17 and fan 19 by means of the flange 28 which is soldered or welded thereto. This deflector 27 then curves downwards to the bottom 1 of the casing where it may be secured by solder or the like if desirable, although this is not necessary.

While the deflectors 24 and 27 are shown attached to the member 7 at their upper ends, it will be apparent that this connection is not necessary but that said members may be secured to said side walls 2 and 3 by solder or welding or the like, and if desirable, may be formed with flanges adapted to be secured to said side walls 2 and 3.

The deflector 24 is so positioned that it will deflect an air stream which is sucked into said casing by the fan 19 up through the opening 22 in the top 7 of the casing and through a corresponding opening in the base of the projector, and thereby cause said air stream to pass between and around the electric lamp, the heat absorbing screen and the last condensing lens, and then be exhausted from the projector through the openings 29 in the top of the projector casing. The deflector 24 is of such length as to allow an opening between its lower end and the deflector 27 which directs a portion of the air stream up through the opening 23 in the top 7 of the casing, and through a corresponding opening in the base of the projector, and then said air current passes around said film or slide, thereby cooling the same and protecting them from the heat from the light source. The air is then exhausted through the openings 29 or through the opening 30 for the slide carrier.

It will be apparent that by utilizing a desired number of deflectors and by placing them in proper location, the air current may be directed to any desired portion of the projector which it is desired to cool. In this manner the air current is directed to the points where it is most needed and serves to more efficiently cool and ventilate the interior of the projector.

In the form of the invention shown in Figs. 4 and 5, the top 7 of the ventilator casing is provided with a single opening 31. On either side of this opening 31 are secured partition members 32 and 33 by means of the screws 34. Secured to said partitions 32 and 33 at their sides by longitudinal flanges are the deflectors 35, 36, 37, 38 and 39. The end of the partitions 32 and 33 are bent to form the deflector 40 which also has a longitudinal flange secured to said sides.

The deflectors 35 and 36 serve to deflect a portion of the air current towards the electric lamp. The deflector 37 is adapted to deflect a portion of the air current between the lamp and first condensing lens. The deflector 38 is adapted to deflect a portion of the air current between and around the first two condensing lenses. The deflector 39 is adapted to deflect a portion of the air current between and around the last two condensing lenses, and the deflector 40 is adapted to deflect the remainder of the air current around the film or lantern slide holder, depending on which is in use.

While the partitions 32 and 33 have been shown, it will be apparent that these members are not necessary, as the deflectors could be secured by their longitudinal flanges directly to the sides 2 and 3 of the ventilator casing. It will be noted that the deflectors employed in the device are correspondingly longer the farther they are located from the fan. This location and graduation of the deflectors allows a portion of the air stream to reach each deflector and be deflected thereby into the particular part of the projector for which said deflector is intended to ventilate.

It will be noted that because of the partitions 32 and 33 the air caused to enter the ventilating apparatus by the fan 19 will be forced into the restricted area formed by the partitions 32 and 33 and thus tend to eliminate loss of air or air pockets, and therefore will cause practically all of the air entering said ventilating apparatus to be directed toward the desired points in the projector to cool the same.

It will be apparent that by employing the ventilator apparatus as set forth above, the projector will be much more efficiently cooled than has been possible with prior devices due to the fact that the air current will be deflected to the parts of the projector requiring the most cooling.

It will also be apparent that by employing our new and improved construction, a ventilating apparatus for projectors may be made which will be considerably lower in size than those previously constructed, and yet, on the other hand, be considerably more efficient than prior constructions.

From the above it will be seen that simple, efficient and economical means have been disclosed for obtaining all of the objects and advantages of the invention.

Having described our invention, we claim:

1. In a device of the character described, a ventilating member adapted to support and ventilate a projector, said member comprising a casing having an opening in one of its side walls and an opening in its top wall, a fan adapted to cause air to enter said casing through said opening in its side wall and to pass from said casing into the projector through the opening in the top wall of said casing, and a plurality of deflecting members of different lengths secured in said casing, one of said deflectors extending substantially from said top wall to the bottom of the casing and the other deflector being shorter in length so that each of said deflectors will direct a portion of the air stream into a different portion of the projector.

2. In a device of the character described, a ventilating member adapted to support and ventilate a projector, said member comprising a casing having an opening in one of its side walls and an opening in its top wall, a fan adapted to cause air to enter said casing through said opening in its side wall and to pass from said casing into the projector through the opening in the top wall of said casing, and a plurality of deflecting members of different lengths secured in said casing, one of said deflectors extending substantially from said top wall to the bottom of the casing and the other deflector being shorter in length and said deflectors being curved throughout a portion of their length so that each of said deflectors will direct a portion of the air stream into a different portion of the projector.

3. In a device of the character described, a ventilating attachment for use with a projector, said ventilating attachment comprising a casing having air entry means in a wall thereof and air exit means in a wall thereof adapted to communicate with the projector, said casing having fan means therein adapted to cause a stream of air to enter said casing through said air entry means inwardly of said casing and a deflecting member extending from adjacent one wall thereof and terminating at a point intermediate said wall and an opposed wall thereof and constituting a part of said ventilating attachment positioned in the path of the incoming air stream and adapted to deflect a portion thereof outwardly of said exit means to direct said air into a particular portion of the projector and a portion of said air stream passing said deflecting member and said portion being directed into another portion of the projector.

4. In a device of the character described, a ventilating attachment for use with a projector, said ventilating attachment comprising a casing having air entry means in a wall thereof and air exit means in a wall thereof adapted to communicate with the projector, said casing having fan means therein adapted to cause a stream of air to enter said casing through said air entry means inwardly of said casing and a deflecting member secured to the wall having the exit means therein adjacent the side of said exit means opposite the location of the fan means and extending downwardly and adapted to receive a portion of the air stream and direct said air stream through the exit means to a particular portion of the projector and a portion of said air stream passing said deflecting member and said portion being directed into another portion of the projector.

HAROLD OSTERBERG.
DAVID I. CRITOPH.